(12) United States Patent
Kim et al.

(10) Patent No.: US 12,009,601 B2
(45) Date of Patent: Jun. 11, 2024

(54) TERMINAL METHOD AND DEVICE FOR SWITCHING ANTENNA IN REAL-TIME

(71) Applicant: Samsung Electronics Co., Ltd., Suwon-si (KR)

(72) Inventors: Daehoon Kim, Suwon-si (KR); Bongjin Kim, Suwon-si (KR); Taekyoung Kim, Suwon-si (KR); Jongho Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 16/965,789

(22) PCT Filed: Feb. 7, 2019

(86) PCT No.: PCT/KR2019/001502
§ 371 (c)(1),
(2) Date: Jul. 29, 2020

(87) PCT Pub. No.: WO2019/156468
PCT Pub. Date: Aug. 15, 2019

(65) Prior Publication Data
US 2020/0365987 A1    Nov. 19, 2020

(30) Foreign Application Priority Data
Feb. 8, 2018    (KR) .................. 10-2018-0015739

(51) Int. Cl.
*H01Q 3/24*    (2006.01)
*H01Q 1/24*    (2006.01)
(Continued)

(52) U.S. Cl.
CPC ............... *H01Q 3/24* (2013.01); *H01Q 1/243* (2013.01); *H04M 1/72454* (2021.01); *H04M 2250/12* (2013.01)

(58) Field of Classification Search
CPC ..... H01Q 3/24; H01Q 1/243; H04M 1/72454; H04M 2250/12
See application file for complete search history.

(56) References Cited

U.S. PATENT DOCUMENTS 9,331,760 B2 * 5/2016 El Ayach .............. H04W 16/28
2002/0106995 A1  8/2002 Callaway, Jr.
(Continued)

FOREIGN PATENT DOCUMENTS

JP    2014-179765 A    9/2014
JP    2017-046228 A    3/2017
(Continued)

OTHER PUBLICATIONS

European Search Report dated Feb. 17, 2021; European Appln. No. 19750890.6-1216 / 3737076 PCT/KR2019001502.

*Primary Examiner* — Cassi J Galt
(74) *Attorney, Agent, or Firm* — Jefferson IP Law, LLP

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. The present invention proposes a method and a device, of a terminal using a millimeter wave, for selecting an antenna in order to transmit/receive a signal in a next-generation communication system. According to the present invention, the terminal may select, on the basis of information acquired from a sensor, an antenna having no physical contact or positioned in a relatively high position.

11 Claims, 8 Drawing Sheets

(51) Int. Cl.
*H04M 1/72* (2021.01)
*H04M 1/72454* (2021.01)

(56) References Cited

U.S. PATENT DOCUMENTS

| | | |
|---|---|---|
| 2009/0295648 A1 | 12/2009 | Dorsey et al. |
| 2011/0102293 A1* | 5/2011 | Chen .................... H01Q 25/005 |
| | | 343/876 |
| 2011/0121995 A1 | 5/2011 | Zettergren et al. |
| 2013/0328723 A1 | 12/2013 | Rappaport |
| 2014/0192927 A1 | 7/2014 | Kim |
| 2014/0274164 A1 | 9/2014 | Hatakeyama |
| 2017/0179996 A1 | 6/2017 | Knepper et al. |
| 2017/0285844 A1 | 10/2017 | Park et al. |
| 2017/0373712 A1 | 12/2017 | Kim et al. |

FOREIGN PATENT DOCUMENTS

| | | |
|---|---|---|
| KR | 10-2007-0114611 A | 12/2007 |
| KR | 10-2014-0090423 A | 7/2014 |
| KR | 10-2017-0112494 A | 10/2017 |
| WO | 2015/019894 A1 | 2/2015 |

* cited by examiner (a)

(450)

(b)

(460)

TERMINAL METHOD AND DEVICE FOR SWITCHING ANTENNA IN REAL-TIME

TECHNICAL FIELD

The present disclosure relates to a terminal for wireless mobile communication using a millimeter wave and, in particular, to a method for selecting in real time an antenna for transmitting and receiving signals from among a plurality of antennas attached to the terminal.

BACKGROUND ART

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system. In order to accomplish a higher data transfer rate, the implementation of the 5G communication system in a super-high frequency (mmWave) band (e.g., about a 60 GHz band) is being considered. Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beam-forming, and a large scale antenna. Additionally, for an improvement in network of the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like. Also, in the 5G communication system, a hybrid FSK and QAM modulation (FQAM) and a sliding window super-position coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, the Internet, which is a human centered connectivity network where humans generate and consume information, is now evolving to the Internet of things (IoT) where distributed entities, such as things, exchange and process information without human intervention. Further, the Internet of everything (IoE), which is a combination of IoT technology and big data processing technology through connection with a cloud server, has emerged. As technology elements, such as sensing technology, wired/wireless communication and network infrastructure, service interface technology, and security technology, have been demanded for IoT implementation, a sensor network, machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected car, smart grid, health care, smart appliances, advanced medical service, etc. through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

When a certain antenna of a terminal being transmitting and receiving a signal using a millimeter wave is gripped by a user or in contact with a user's body or other object, the channel environment of the antenna becomes poor due to the low transmittance characteristics of the millimeter wave. This causes the degradation of performance. In addition, antennas of the terminal may be confronted with poor channel environments depending on various usage states and movement states of the terminal.

DISCLOSURE OF INVENTION

Technical Problem

In order to solve this problem, there is a need to provide a method and device for selecting in real time an antenna with a strong possibility of having a better channel environment from among antennas of a terminal, and for transmitting and receiving a signal through the selected antenna.

Solution to Problem

According to the disclosure, a method of a terminal for selecting an antenna for transmitting and receiving a signal using a millimeter wave may include acquiring state information of the terminal from at least one sensor; selecting at least one antenna from among a plurality of antennas included in the terminal, based on the state information; and performing signal transmission and reception by using the at least one antenna. The antennas may be disposed at different positions of the terminal. The state information of the terminal, which is information indicating at least one of movement state information or usage state information of the terminal, may include at least one of information indicating whether a physical contact of the at least one antenna is occurred, information indicating a relative position of the at least one antenna, or movement status information of the terminal. Selecting the at least one antenna may be performed to select an antenna with a strong possibility of having a good channel state.

In addition, the method may include identifying whether a sensor interrupt is occurred; in case that the sensor interrupt occurs, determining whether a grip sensor interrupt is occurred; in case that the grip sensor interrupt is occurred, acquiring grip sensor information; and selecting an antenna for the signal transmission and reception, based on the grip sensor information. The grip sensor information indicates which grip sensor detects a physical contact. Selecting the antenna for the signal transmission and reception, based on the grip sensor information, may be performed based on predefined relationship information that correlates the grip sensor information to first and second states of the antenna, and may be performed to preferentially select an antenna having no physical contact, based on the grip sensor information.

In addition, the method may further include acquiring RF control timing information indicating a timing for controlling the selected antenna, and may also include acquiring 6-axis sensor information in case that grip sensor interrupt is not occurred; and selecting an antenna for the signal transmission and reception, based on the 6-axis sensor information. The 6-axis sensor information indicates which antenna is positioned relatively above. Selecting the antenna for the signal transmission and reception, based on the 6-axis sensor information, may be performed to select an antenna positioned relatively above.

In addition, selecting the antenna for the signal transmission and reception, based on the grip sensor information, may be performed to select two antennas in case that the grip sensor information indicates that one of four grip sensors detects a physical contact, select two antennas in case that the grip sensor information indicates that two of the four grip sensors detect physical contacts, select one antenna in case that the grip sensor information indicates that three of the four grip sensors detect physical contacts, and select one antenna in case that the grip sensor information indicates that all of the four grip sensors detect physical contacts.

In addition, a terminal for selecting an antenna for transmitting and receiving a signal using a millimeter wave may include a sensor identifying a sensor interrupt is occurred and, if the sensor interrupt occurs, determining whether a grip sensor interrupt is occurred; and a processor acquiring grip sensor information in case that the grip sensor interrupt is occurred, and selecting an antenna for signal transmission and reception, based on the grip sensor information. The grip sensor information indicates which grip sensor detects a physical contact. The processor may further acquire RF control timing information indicating a timing for controlling the selected antenna.

In addition, the terminal may further include a controller for controlling the selected antenna to a first state and controlling a non-selected antenna to a second state.

Advantageous Effects of Invention

According to a method and device for selecting an antenna of a terminal in embodiments of the present disclosure, it is possible to select in real time an antenna with a strong possibility of having a better channel environment and thereby improve communication performance.

MODE FOR THE INVENTION

Figure 1:
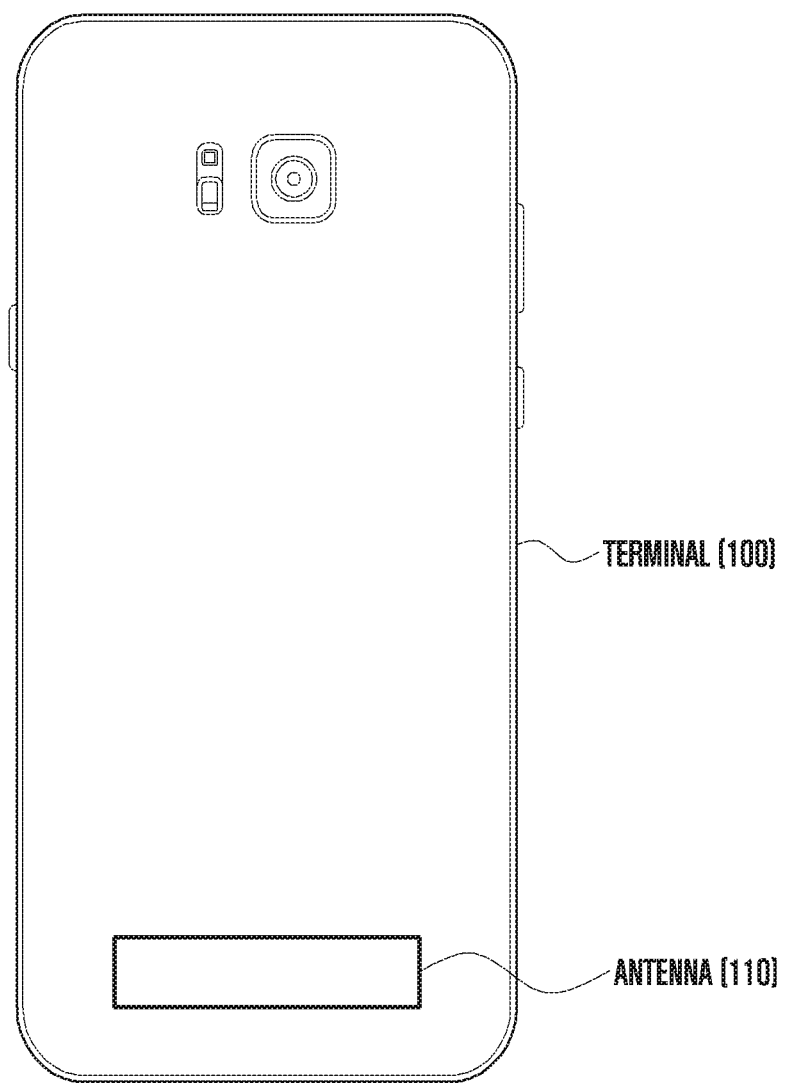
FIG. 1 is a diagram illustrating a typical antenna arrangement of a terminal used in a mobile communication system.

Now, various embodiments of the disclosure will be described in detail with reference to the accompanying drawings. In the following, descriptions of techniques that are well known in the art and not directly related to the disclosure may be omitted. This is to clearly convey the subject matter of the disclosure by omitting unnecessary explanation. Terms used herein may not be intended to limit embodiments described in the disclosure.

In addition, embodiments described hereinafter on the basis of a particular communication system may be also applied to any other communication system having a similar technical background or channel form through some modifications within the scope of the disclosure. This will be apparent to a person skilled in the art.

The advantages and features of the disclosure and the manner of achieving them will become apparent with reference to embodiments described in detail below and with reference to the accompanying drawings. The disclosure may, however, be embodied in many different forms and should not be construed as being limited to the embodiments set forth herein. Rather, these embodiments are provided so that the disclosure will be thorough and complete and will fully convey the scope of the disclosure to those skilled in the art. To fully disclose the scope of the disclosure to those skilled in the art, the disclosure is only defined by the scope of claims. In the disclosure, similar reference numbers are used to indicate similar constituent elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processors (CPUs) in a device or a secure multimedia card.

In this disclosure, a terminal is a device capable of performing a wireless mobile communication function and may be referred to as a user equipment, a terminal, or the like, including information communication devices and multimedia devices, such as a mobile phone, a smart phone, a tablet computer, a personal digital assistant (PDA), or a laptop computer, and applications therefor. In addition, this disclosure can be applied to both transmission and reception of signals. Specifically, it can be applied to both uplink transmission in which the terminal transmits a signal to the base station, and downlink transmission in which the base station transmits a signal to the terminal.

The next-generation mobile communication technology (also referred to as the fifth-generation mobile communication technology or new radio (NR)) that is currently being researched requires a wider bandwidth for signal transmission and reception than the previous generation mobile communication technology, long term evolution (LTE). In the next-generation mobile communication technology, a technique of transmitting and receiving a signal using the millimeter wave (mm wave) band as a frequency band is actively researched. The millimeter wave band has characteristics of a lower transmittance and a higher path loss rate than the frequency band used in the LTE system. In order to solve this problem, beamforming technology is used as a supplement to a path loss, and antenna arrays for forming beams are mounted in a terminal. The terminal may include several pairs of antenna arrays mounted therein, and may transmit and receive signals by using an antenna selected with an appropriate rule.

In addition, for convenience of a user, various sensors such as a grip sensor, a magnetic sensor, and a 6-axis sensor are mounted in a mobile communication terminal.

When a certain antenna of a terminal being transmitting and receiving a signal using a millimeter wave is gripped by a user or in contact with a user's body or other object, the channel environment of the antenna becomes poor due to the low transmittance characteristics of the millimeter wave. This causes the degradation of performance. In addition, antennas of the terminal may be confronted with poor channel environments depending on various usage states and movement states of the terminal.

FIG. 1 is a diagram illustrating a typical antenna arrangement of a terminal used in a mobile communication system.

According to FIG. 1, an antenna 110 is mounted near one edge of a surface opposite to a display-side surface of a terminal 100. This is only an example, and the position of the antenna may be varied. When a frequency band around 2 GHz is used as in the LTE system, the transmittance of a signal is high. Thus, the communication performance is not affected significantly by whether the terminal antenna is in contact.

In contrast, a millimeter wave has a lower transmittance and a greater path loss than a signal of a frequency band used in the LTE system. Thus, when an antenna attached to a terminal is gripped by or in contact with a user, a channel environment of the antenna becomes poor and thereby the communication performance will be degraded. In order to solve this problem, the present disclosure provides a method and device for identifying states of antennas attached to a terminal, determining an antenna with a strong possibility of having a better channel environment, and then transmitting/receiving a signal through the antenna. Such antenna states are determined based on state information of the terminal. The state information may include information indicating a movement state and/or a usage state, and may also include any information detected through all sensors that help to select an antenna in connection with the state of the terminal.

Figure 2:
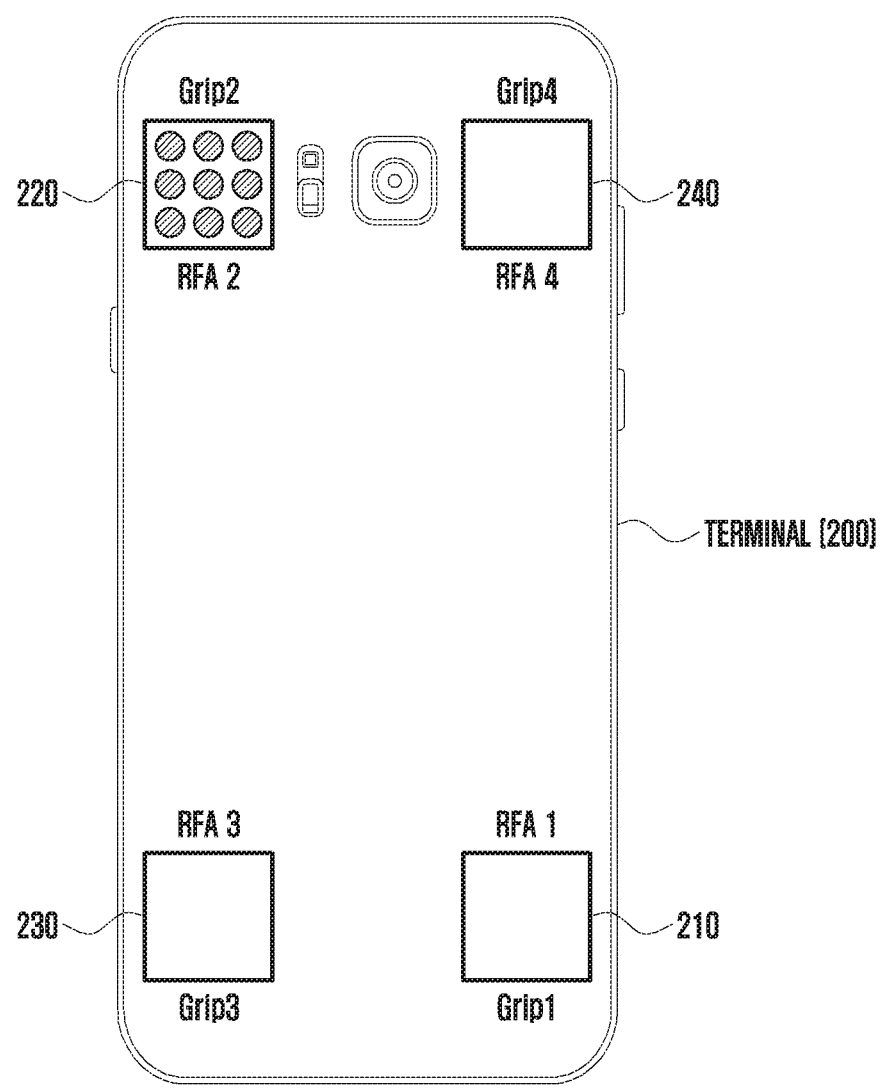
FIG. 2 is a diagram illustrating an example of an antenna arrangement according to the present disclosure.

FIG. 2 is a diagram illustrating an example of an antenna arrangement according to the present disclosure.

According to FIG. 2, grip sensors 210, 220, 230, and 240 are disposed at respective corners of a battery-side surface (or referred to as a surface opposite to a display-side surface, or a rear surface) of a terminal 200. The grip sensor is a sensor capable of detecting a physical contact of the terminal. Thus, the grip sensors make it possible to acquire information about which portion of the terminal is gripped by the user or is in physical contact. The grip sensor may be formed of a detection sensor of a capacitive overlay scheme, a resistive overlay scheme, or an infrared beam scheme, or formed of a pressure sensor. This is not construed as a limitation, and any kind of sensor that can detect the contact or pressure of an object may be used as the grip sensor.

Antennas are disposed at four corners of the terminal, respectively, similar to the positions of the grip sensors 210, 220, 230, and 240. The terminal may select two of the four antennas in case of multi-input multi-output (MIMO) transmission/reception, and may select one of the four antennas in case of single-input single-output (SISO) transmission/reception.

Although it is described assuming that the grip sensors and the antennas are disposed at four corners of the battery-side surface of the terminal, this is exemplary only. The grip sensors and the antennas may be disposed at other positions, and even in this case the subject matter of the disclosure may be similarly applied. In addition, although four antennas are shown as an example, the number of antennas is decreased or increased. Also, the antennas may be disposed on the display-side surface rather than the battery-side surface.

In addition, although not shown, the terminal may include a 6-axis sensor, which may be disposed at any position of the terminal. The 6-axis sensor may be composed of, but not limited to, a gyro sensor, an acceleration sensor, and/or a geomagnetic sensor. Any kind of sensor capable of detecting degrees in which the terminal is tilted with respect to the x, y, and z axes can be used as the 6-axis sensor.

In addition, any kind of sensor capable of detecting a usage state of the terminal may be included in the terminal.

In addition, although not shown, the terminal may include a sensor capable of identifying a movement state of the terminal. Such a sensor that can identify the movement state (e.g., a movement speed, a movement direction, etc.) of the terminal may include a magnetic sensor and/or an acceleration sensor, and any kind of sensor capable of identifying the speed and position of the terminal. Also, the movement state of the terminal may be identified based on information acquired through a receiver for using a global positioning system (GPS) or information acquired from a cellular communication system including the LTE or next-generation communication system.

Figure 3:
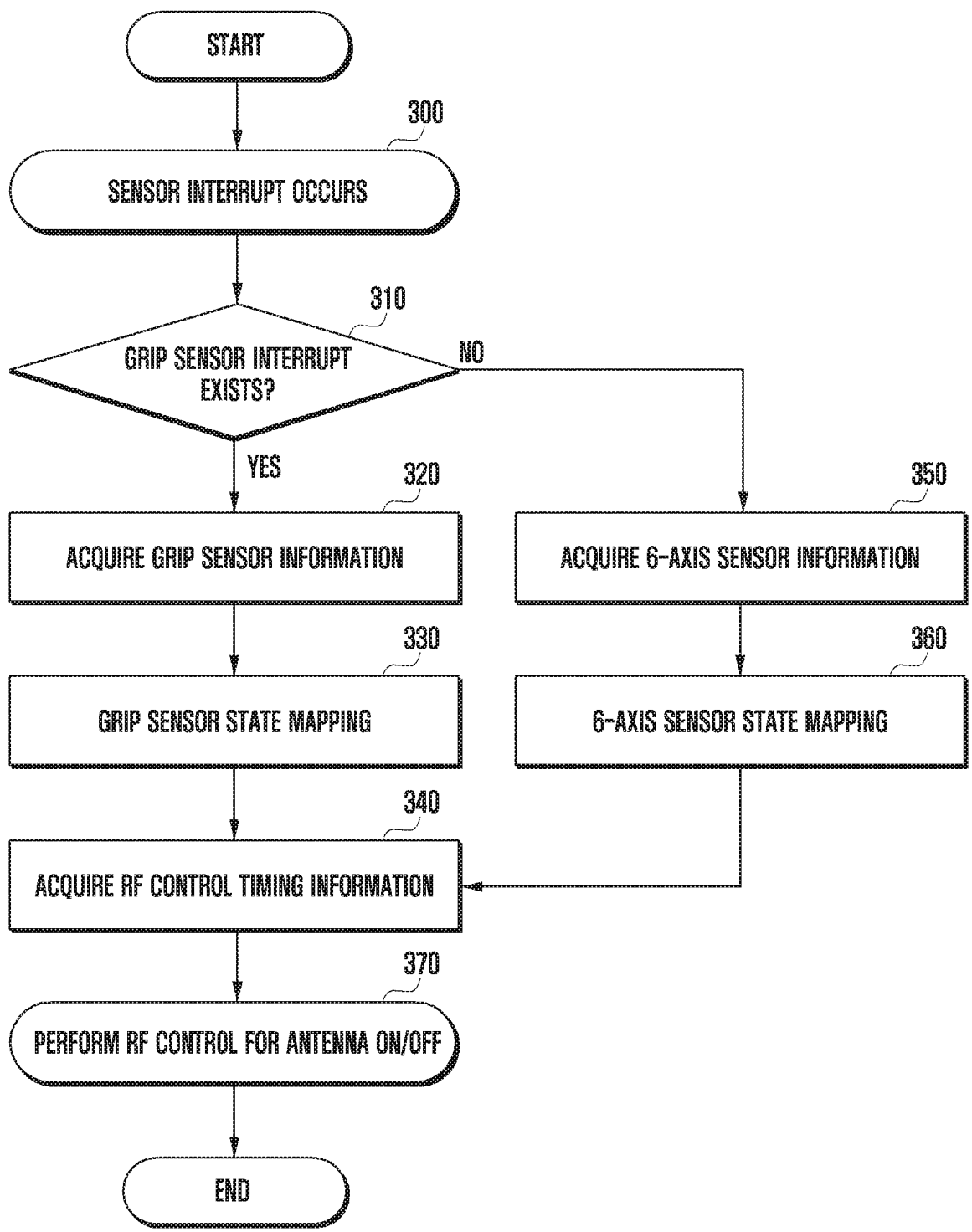
FIG. 3 is a flow diagram illustrating an embodiment of the present disclosure for selecting an antenna having a good channel state.

FIG. 3 is a flow diagram illustrating an embodiment of the present disclosure for selecting an antenna having a good channel state. In particular, FIG. 3 relates to a case of using both the grip sensor and the 6-axis sensor.

Referring to FIG. 3, the occurrence of a sensor interrupt is identified by a sensor (step 300). The sensor interrupt occurs when one or more of a plurality of sensors included in the sensor detects a change in state. Although it is described exemplarily in this disclosure that the sensor is composed of the grip sensor and the 6-axis sensor, any other sensor that can help with antenna selection may be also used. The interrupt of the grip sensor may refer to a case where a contact different from the previous state continues for a particular time or a case where a contact of a particular intensity (or pressure) or more continues for a particular time. In addition, the interrupt of the 6-axis sensor may refer to a case where a specific position of the terminal different from the previous state continues for a particular time. Such particular time and intensity may be predetermined or may be variable to be settable.

If the sensor interrupt is identified, it is identified whether a grip sensor interrupt exists in the interrupt (step 310). If the grip sensor interrupt is occurred, grip sensor information is acquired (step 320). When a certain contact continues for a particular time or when a contact having a particular intensity or more continues for a particular time, the grip sensor may determine that a physical contact exists. The grip sensor information indicates which of the grip sensors disposed at four corners of the terminal has a physical contact. Through this, a physically contacted portion of the terminal can be identified, so that an antenna which is in an open state (i.e., in a state of no physical contact) can be identified (hereinafter, the antenna will be also referred to as a radio frequency (RF) antenna). When a certain grip sensor detects a physical contact, it may be determined that a corresponding antenna existing at the same position as the grip sensor is not in an open state. This process may be performed by the sensor or the processor. Because of the nature of the millimeter wave, it is highly likely that an antenna being in the open state has a better channel environment than the other antennas. Thus, the terminal should transmit and receive signals through the open state antenna.

If sensor interrupt is not occurred, all antennas of the terminal are in the open state. Therefore, the currently used antenna can be maintained.

In addition, both the grip sensor interrupt and the 6-axis sensor interrupt may exist in the sensor interrupt. In this case, if the user grips the terminal or a physical contact is occurred with the terminal antenna, the antenna is selected only based on the grip sensor information. Only if physical contact is not occurred with the terminal (that is, only if grip sensor interrupt is not occurred), the antenna is selected based on information of the 6-axis sensor. Thus, information is acquired through the 6-axis sensor only when there is no contact detected by the grip sensor.

After step 320, the ON/OFF of the antenna is determined based on the information of the grip sensor. This is a grip sensor state mapping process (step 330). This process is to determine an antenna to be used, depending on the detection of the grip sensor, and the processor may correlate the ON/OFF states of four antennas to the states of four grip sensors, based on Table 1 below. Information of Table 1 may be stored in a memory. The ON state of the antenna means that power is supplied to an RF unit (which is a radio frequency transceiver configured as a circuit), so that the antenna is used to transmit and receive signals. The OFF state means that no power is supplied to the RF unit and/or the antenna is not used to transmit and receive signals.

TABLE 1

| State | If | | | | Work | | | |
|---|---|---|---|---|---|---|---|---|
| | Grip1 | Grip2 | Grip3 | Grip4 | RFA 1 | RFA 2 | RFA 3 | RFA 4 |
| 1 | X | X | X | X | X | O | X | O |
| 2 | O | X | X | X | X | O | X | O |
| 3 | X | O | X | X | O | X | O | X |
| 4 | X | X | O | X | X | O | X | O |
| 5 | X | X | X | O | O | X | O | X |
| 6 | O | X | O | X | X | O | X | O |
| 7 | O | X | X | O | X | O | O | X |
| 8 | X | O | O | X | O | X | X | O |
| 9 | X | O | X | O | O | X | O | X |
| 10 | O | O | O | X | X | X | X | O |
| 11 | X | O | O | O | O | X | X | X |
| 12 | O | X | O | O | X | O | X | X |
| 13 | O | O | X | O | X | X | O | X |
| 14 | O | O | O | O | X | O | X | O |

In Table 1, 'O' indicates that the grip sensor detects a contact (that is, there is a physical contact) or that the RF antenna (RFA) is in the ON state. In addition, 'X' indicates that the grip sensor detects no contact (that is, there is no physical contact) or that the RFA is in the OFF state. Table 1 shows that when the grip sensor detects a contact, the RF antenna disposed at the same position as the grip sensor is not used as far as possible. In addition, when multiple grip sensors detect contacts, SISO transmission is performed because a state of a channel using a millimeter wave is degraded. In contrast, when multiple grip sensors do not detect contacts, MIMO transmission is performed because the channel state is not degraded.

Figure 4A:
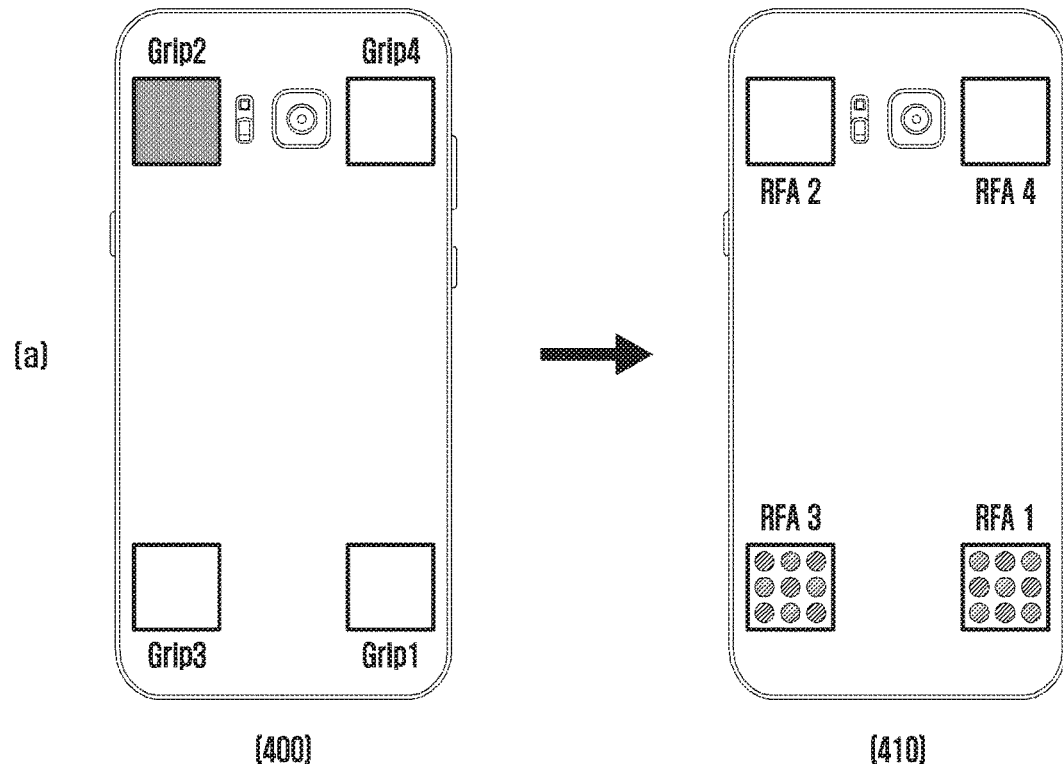
FIG. 4A is a diagram illustrating a specific example of grip sensor state mapping.
Figure 4A:
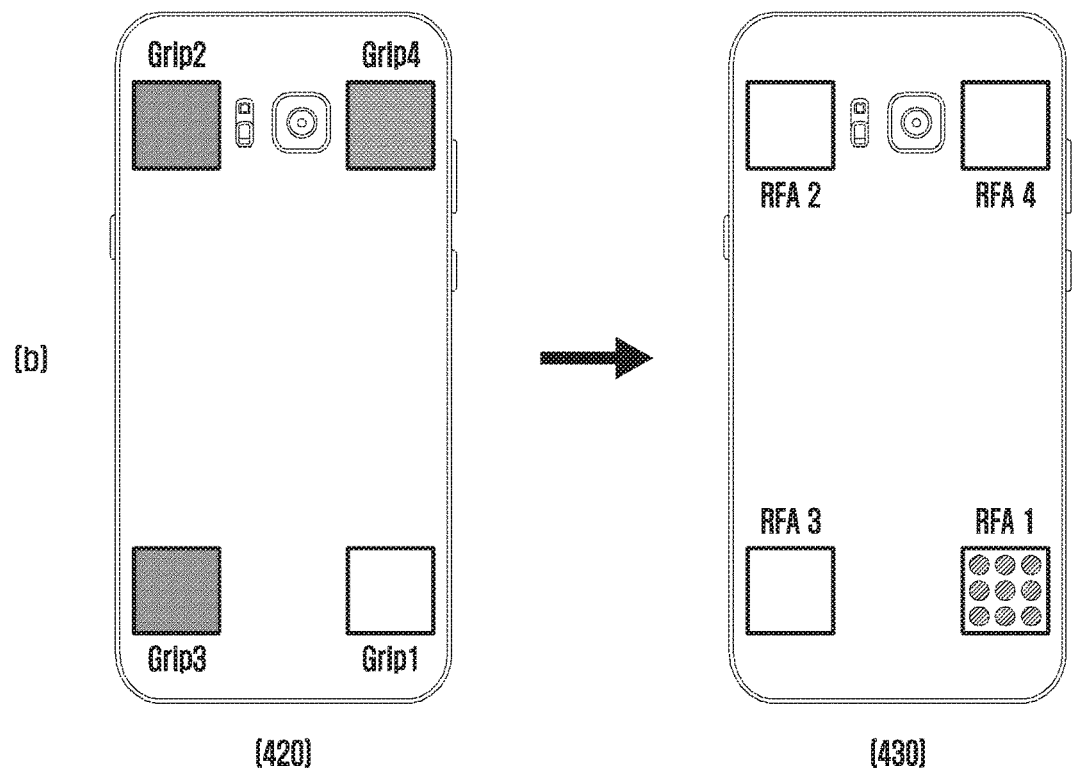

FIG. 4A is a diagram illustrating a specific example of grip sensor state mapping.

Referring to FIG. 4A, when the second grip sensor detects a physical contact and when the first, third, and fourth grip sensors detect no physical contact (case 400), the first and third RF antennas may be controlled to be in the ON state and the second and fourth RF antennas may be controlled to be in the OFF state (case 410). This corresponds to state 3 in Table 1 above.

In addition, when the second, third, and fourth grip sensors detect physical contacts and when the first grip sensor detects no physical contact (case 420), the first RF antenna may be controlled to be in the ON state and the second, third, and fourth RF antennas may be controlled to be in the OFF state (case 430). This corresponds to state 11 in Table 1 above.

If the grip sensor interrupt does not exist at step 310, the interrupt occurring at step 300 is the interrupt of the 6-axis sensor. Thereafter, the processor or the sensor acquires information of the 6-axis sensor (step 350). The 6-axis sensor information indicates a specific position of the terminal when the terminal maintains the specific position for a particular time or more. Based on the 6-axis sensor information, it is possible to identify which antenna of the terminal is positioned relatively above. This also means that the identified antenna is positioned farther from the ground relative to the other antennas. Based on the 6-axis sensor information, it is possible to know which antenna is at a relatively high position. Because this antenna has a strong possibility of corresponding to a channel of a good environment, the processor determines to control that antenna to be turned on. This is a 6-axis sensor state mapping process (step 360).

Figure 4B:
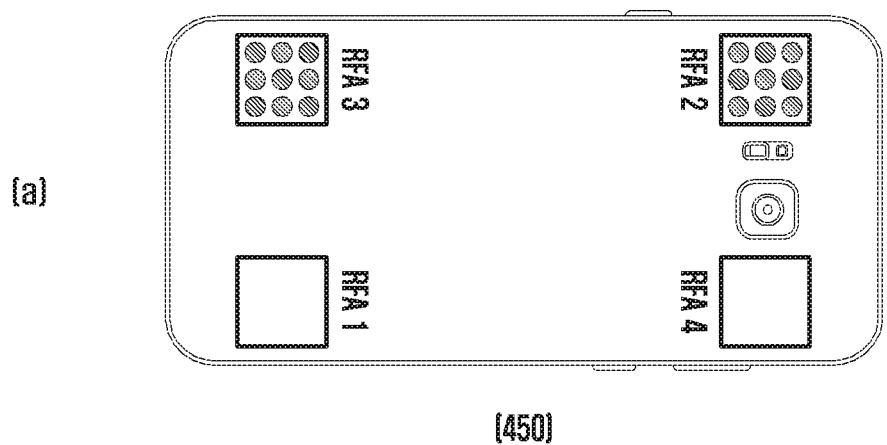
FIG. 4B is a diagram illustrating a specific example of 6-axis sensor state mapping.
Figure 4B:
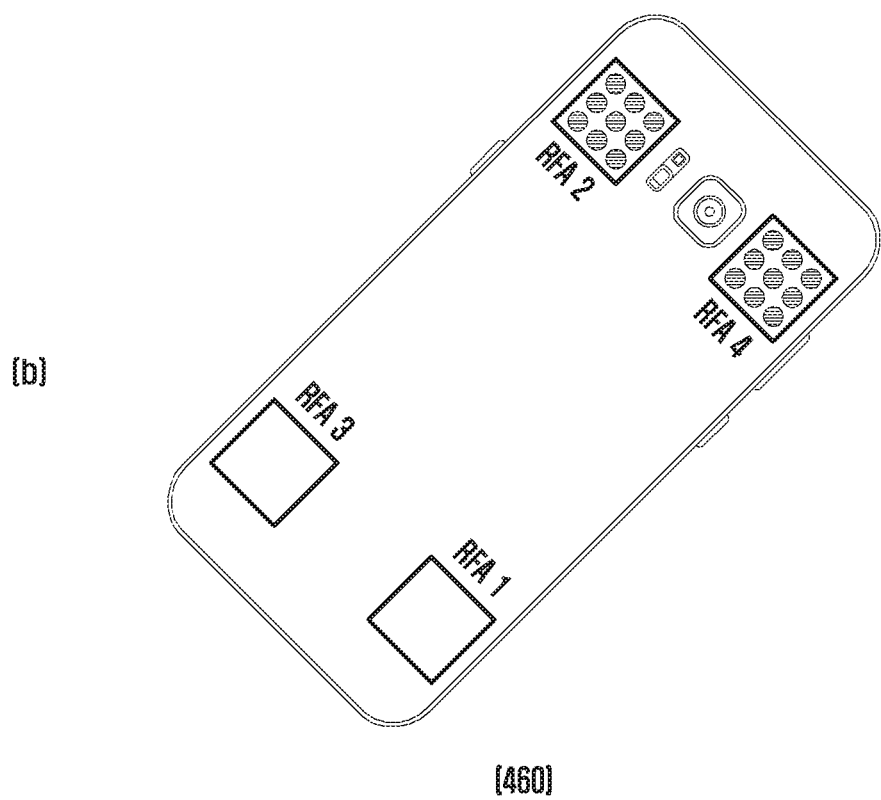

FIG. 4B is a diagram illustrating a specific example of 6-axis sensor state mapping.

Referring to FIG. 4B, in case of 450, the second and third RF antennas are positioned relatively above the first and fourth RF antennas. In this case, one of the second and third RF antennas may be used for SISO transmission in the ON state, or both may be used for MIMO transmission in the ON state. Also, in case of 460, the second and fourth RF antennas are positioned relatively above the first and third RF antennas. In this case, the second RF antenna may be used for SISO transmission in the ON state, or the second and fourth RF antennas may be used for MIMO transmission in the ON state.

Thereafter, the terminal should attempt an RF control to match the four antennas to the determined ON/OFF states, and the processor acquires RF control timing information for this (step 340). The RF control includes various controls such as an RF gain adjustment and an analog beam change, and the RF control for the ON/OFF states cannot be performed simultaneously with such other controls. Therefore, proper RF control timing information is required in order to avoid collision with other RF controls. For example, if an RF antenna is in the OFF state, the controller may control the RF antenna to the ON state. In addition, if the RF antenna is in the ON state, and if any other control is being performed, the controller may control the RF antenna to the OFF state after the other control is ended. The RF control timing information indicates a time point when the RF antenna is controlled to the ON or OFF state. Thus, the terminal that acquires this information can identify the time point of having to attempt the antenna ON/OFF control.

At the control time point according to the RF control timing information, the controller performs the RF control for the antenna ON/OFF depending on the antenna ON/OFF state (step 370). When this process is completed, the terminal can transmit and receive signals through a non-gripped antenna.

FIG. 3 shows a case of determining an antenna to be used, preferentially considering the grip sensor information rather than the 6-axis sensor information. Alternatively, it is also possible to preferentially consider the 6-axis sensor information. In this case, the step 310 of FIG. 3 is replaced with determining whether an interrupt of the 6-axis sensor is occurred. Then, if the 6-axis sensor interrupt is occurred, the antenna ON/OFF may be controlled through the 6-axis sensor state mapping according to the 6-axis sensor information. If no 6-axis sensor interrupt is occurred, the antenna ON/OFF may be controlled through the grip sensor state mapping according to the grip sensor information.

Figure 5:
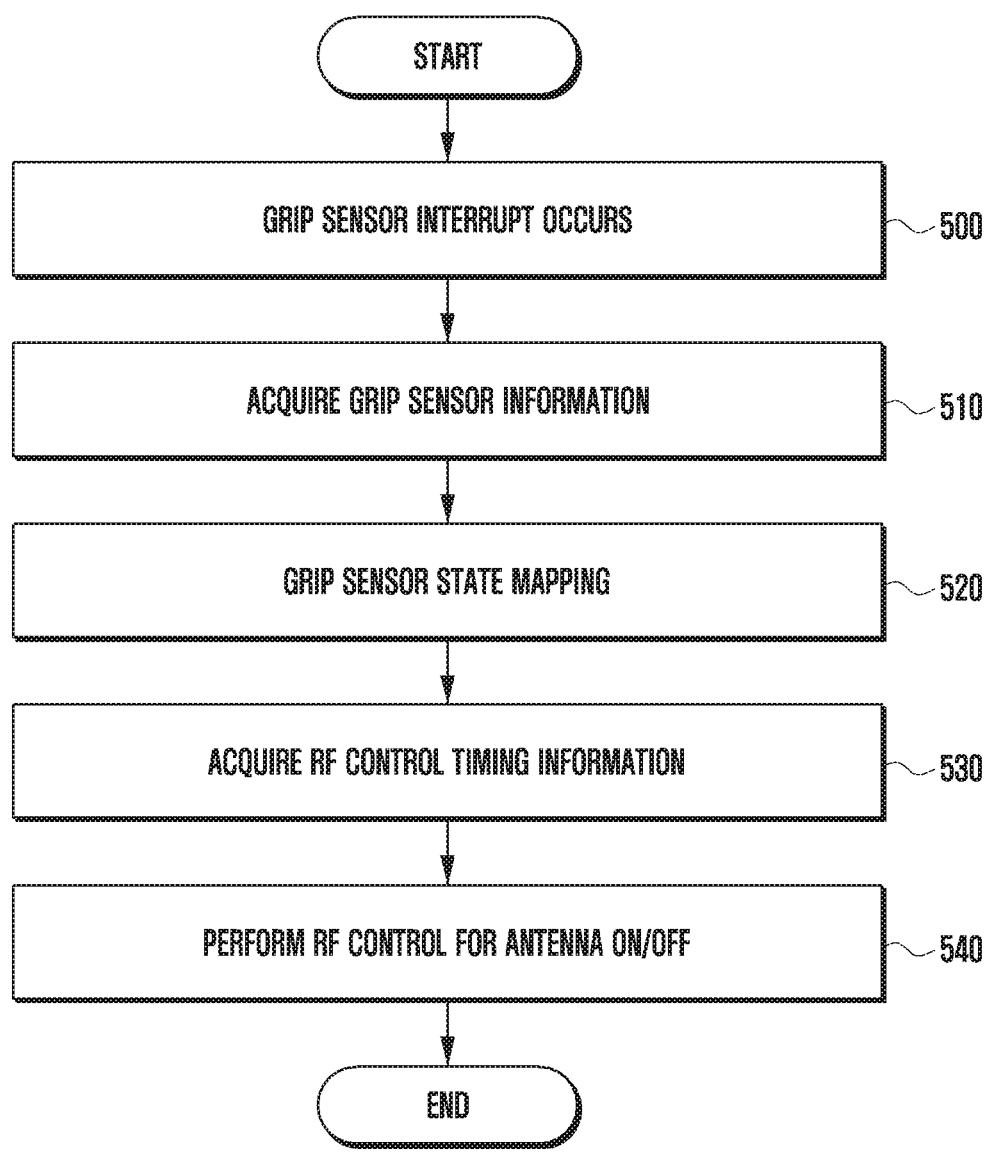
FIG. 5 is a flow diagram illustrating another embodiment of the present disclosure for selecting an antenna having a good channel state.

FIG. 5 is a flow diagram illustrating another embodiment of the present disclosure for selecting an antenna having a good channel state. In particular, FIG. 5 relates to a case of using the grip sensor.

Referring to FIG. 5, the sensor identifies whether a grip sensor interrupt is occurred (step 500). Then, the sensor or the processor acquires grip sensor information (step 510). The grip sensor information indicates which grip sensor has a physical contact. Thereafter, the processor performs grip sensor state mapping based on the grip sensor information (step 520) and thereby determines which antenna will be controlled to the ON/OFF state. Then, the processor acquires RF control timing information (step 530), and the controller performs an RF control for the antenna ON/OFF based on the RF control timing information (step 540). This technique related to FIG. 5 may be understood based on the above-described technique related to FIG. 3.

Figure 6:
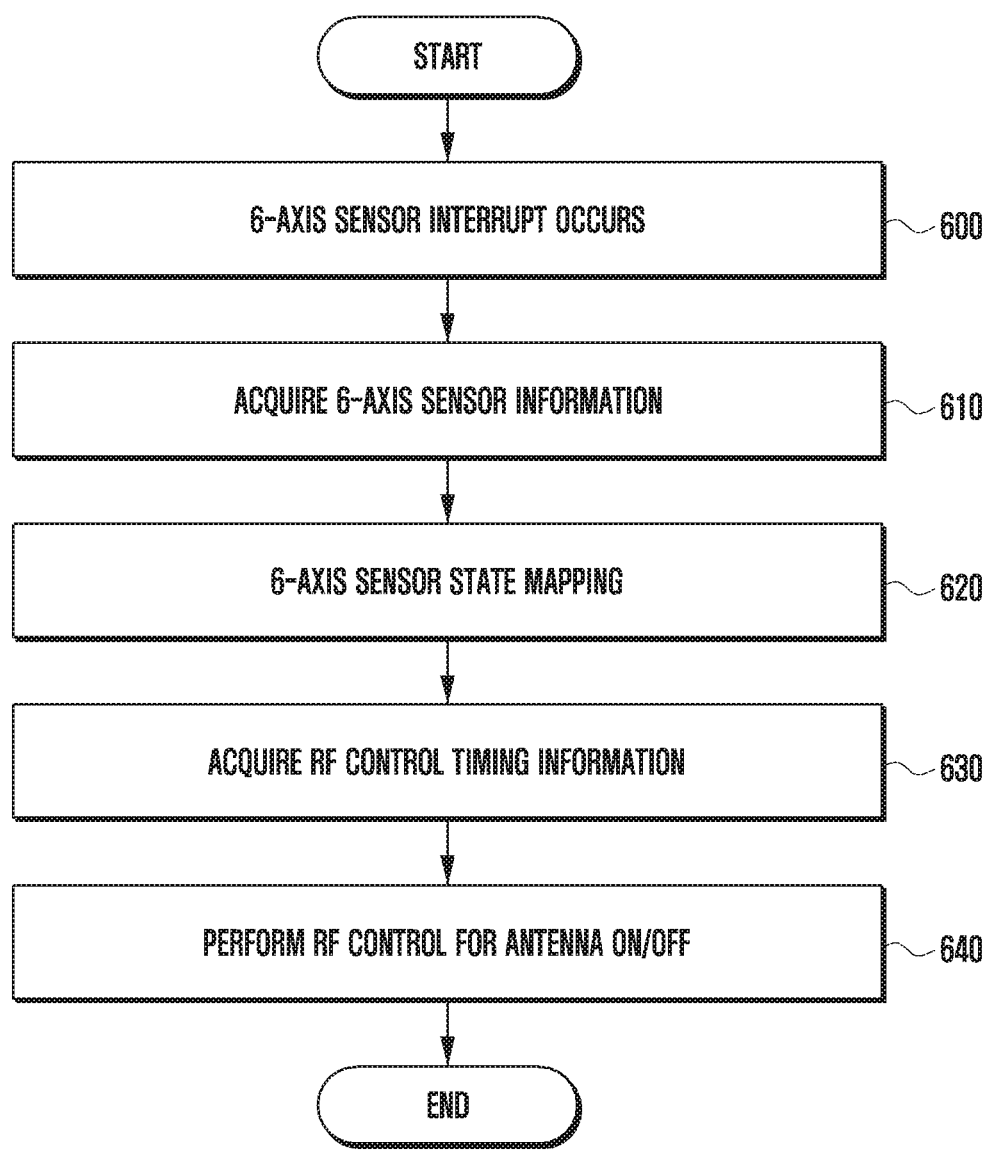
FIG. 6 is a flow diagram illustrating still another embodiment of the present disclosure for selecting an antenna having a good channel state.

FIG. 6 is a flow diagram illustrating still another embodiment of the present disclosure for selecting an antenna having a good channel state. In particular, FIG. 6 relates to a case of using the 6-axis sensor.

Referring to FIG. 6, the sensor identifies whether a 6-axis sensor interrupt is occurred (step 600). Then, the sensor or the processor acquires 6-axis sensor information (step 610). The 6-axis sensor information indicates which antenna is positioned above. Thereafter, the processor performs 6-axis sensor state mapping based on the 6-axis sensor information (step 620) and thereby determines which antenna will be controlled to the ON/OFF state. Then, the processor acquires RF control timing information (step 630), and the controller performs an RF control for the antenna ON/OFF based on the RF control timing information (step 640). This technique related to FIG. 6 may be understood based on the above-described technique related to FIG. 3.

In addition, an antenna having a good channel state may be selected in consideration of a movement state of the terminal. For example, the terminal may identify the movement state (which may include a movement speed, a movement direction, etc.) by using at least one sensor described above. If the terminal is moving at a high speed, a channel environment of an antenna transmitting and receiving signals is less likely to change rapidly. Therefore, maintaining the currently used antenna may ensure stable performance (alternatively, because it is difficult to perform signal transmission and reception by identifying a channel environment and using feedback of channel state information when the terminal is moving at a high speed, the terminal may select fewer antennas for stable transmission). In contrast, if the terminal is moving at a slow speed or is stationary, a channel environment is likely to change. Therefore, it may be advantageous in system performance to increase the number of candidates of selectable antenna (alternatively, because it is possible to perform signal transmission and reception by identifying a channel environment and using feedback of channel state information, the terminal may select more antennas for stable transmission).

It is also possible to ensure a better channel environment by selecting an antenna placed in a movement direction of the terminal. Further, it is possible to determine a candidate group of selectable antennas, based on a movement speed, and then select an antenna placed in a movement direction from the candidate group. This makes it possible to transmit and receive signals through a stable and good channel.

Such antenna selection considering the movement state of the terminal may be implemented in addition to the embodiments of antenna selection described above in FIGS. 3, 5, and 6. Alternatively, the terminal may select the antenna, based only on the movement state information of the terminal. In this case, the terminal may acquire the movement state information indicating a movement speed and/or movement direction of the terminal through the sensor, and the processor may select an antenna to be used for signal transmission and reception, based on the movement state information, by using the above-described method.

According to the disclosure, a method of a terminal for selecting an antenna for transmitting and receiving a signal using a millimeter wave may include acquiring state information of the terminal from at least one sensor; selecting at least one antenna from among a plurality of antennas included in the terminal, based on the state information; and performing signal transmission and reception by using the at least one antenna. The antennas may be disposed at different positions of the terminal. The state information of the terminal, which is information indicating at least one of movement state information or usage state information of the terminal, may include at least one of information indicating whether a physical contact of the at least one antenna is occurred, information indicating a relative position of the at least one antenna, or movement status information of the terminal. Selecting the at least one antenna may be performed to select an antenna with a strong possibility of having a good channel state.

Figure 7:
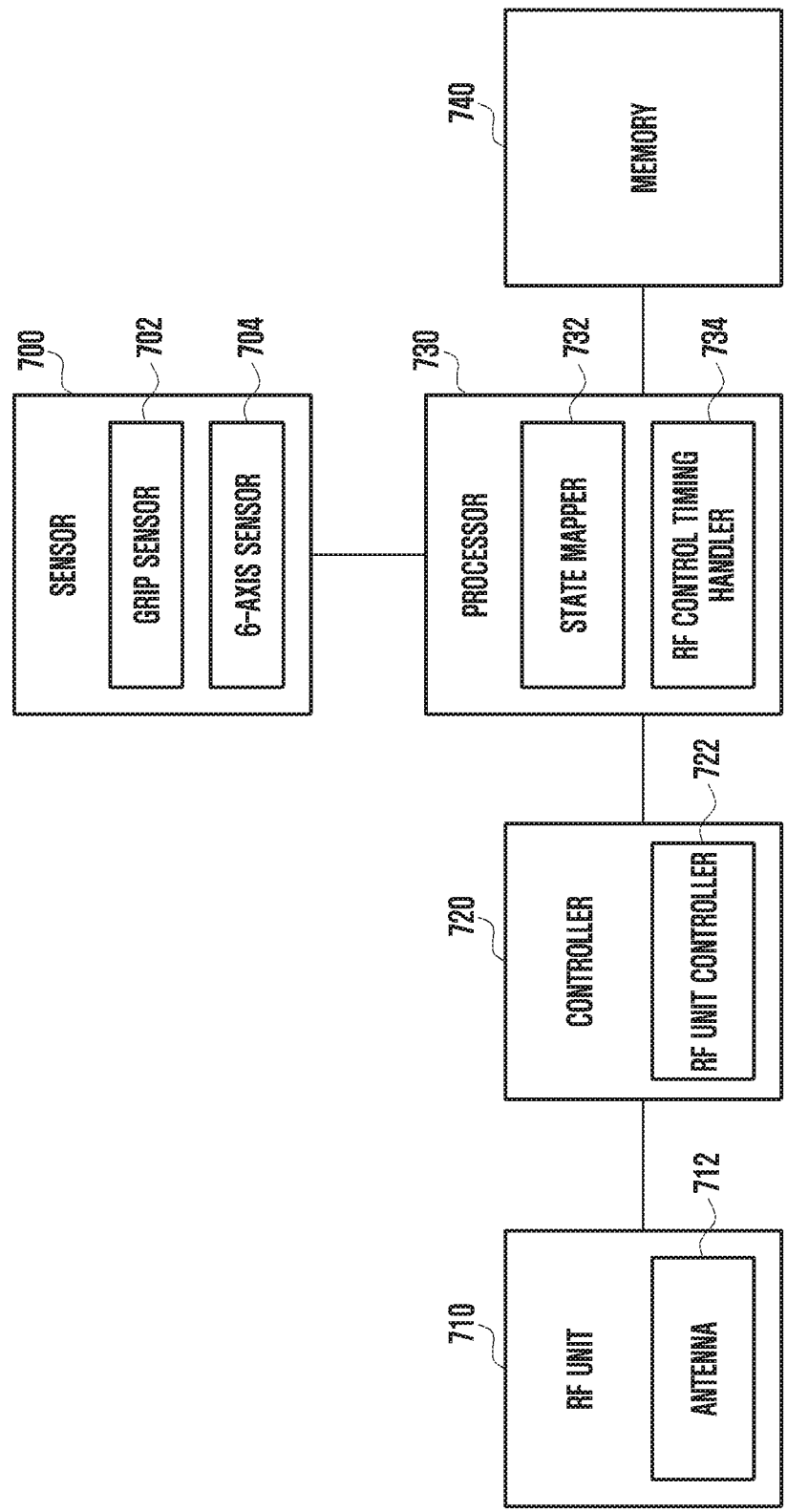
FIG. 7 is a block diagram illustrating a terminal device for performing the present disclosure.

FIG. 7 is a block diagram illustrating a terminal device for performing the present disclosure.

Referring to FIG. 7, the terminal device may include a sensor 700, a radio frequency (RF) unit 710, a controller 720, a processor 730, and a memory 740. The sensor 700 may include a grip sensor 702 and a 6-axis sensor 704, and may also include any other sensor that can assist in antenna selection. The sensor may identify a sensor interrupt and acquire grip sensor information and 6-axis sensor information.

The RF unit 710 is a device that performs radio frequency transmission and reception and may include an antenna 712. An RF unit controller 722 included in the controller 720 performs a function of controlling the RF unit 710. This function of the RF unit controller 722 may be performed by the controller 720 or the processor 730.

The processor 730 includes a state mapper 732 and an RF control timing handler 734. The state mapper 732 determines ON/OFF states of a plurality of antennas by using state mapping information as shown in Table 1 stored in the memory 740, based on grip sensor information. Alternatively, the state mapper 732 determines the ON/OFF states of the plurality of antennas, based on 6-axis sensor information. The RF control timing handler 734 identifies and acquires RF control timing information indicating a timing at which an RF control is available. Such functions of the state mapper 732 and the RF control timing handler 734 may be performed by the processor 730.

The memory 740 may store the state mapping information as shown in Table 1, and may also store information received from a base station and information to be transmitted to the base station.

Although FIG. 7 shows the controller 720 and the processor 730 separately, the functions performed by the controller 720 and the processor 730 may be performed by a controller in the broad sense.

Although not shown, each block shown in FIG. 7 may be disposed inside the terminal device in the form of an integrated circuit (IC), and the 6-axis sensor may also be disposed inside the terminal device. The outer surface of the terminal device may be composed of a front display and a rear case, and the grip sensor and the antenna may be disposed at each corner of the rear case.

Due to the nature of the millimeter wave signal, which has weak transmittance, the channel environment is severely deteriorated when the antenna is gripped or when the signal transmitted from the antenna is physically blocked. This leads to performance degradation. In the mobile communication system, the terminal is used with user's random contacts and has many physical contacts with other objects.

The present disclosure is to reduce a possibility of such performance degradation and also improve communication performance by selecting an antenna having a relatively good channel environment in real time by using a sensor of a terminal.

The invention claimed is:

1. A method of a terminal for selecting an antenna for transmitting and receiving a signal using a millimeter wave, the method comprising:
   acquiring state information of the terminal from a plurality of types of sensors;
   selecting at least one antenna from among a plurality of antennas included in the terminal, based on the state information; and
   performing signal transmission and reception by using the at least one antenna,
   wherein the plurality of types of sensors comprises a grip sensor and a 6-axis sensor,
   wherein selecting the at least one antenna includes:
      determining whether a grip sensor interrupt is being received,
      during a period of time that the terminal is receiving the grip sensor interrupt, acquiring grip sensor information from the grip sensor, and selecting an antenna for the signal transmission and reception to select preferentially an antenna that physical contact is not occurred, based on the grip sensor information, and
      during the period of time that the terminal is free from receiving the grip sensor interrupt, acquiring 6-axis sensor information from the 6-axis sensor, and selecting an antenna for the signal transmission and reception, based on the 6-axis sensor information, and
   wherein the 6-axis sensor information indicates which antenna is positioned relatively above.

2. The method of claim 1, wherein, when the at least one antenna includes two or more antennas, the two or more antennas are disposed at different positions of the terminal.

3. The method of claim 1, wherein the state information of the terminal includes at least one of movement state information or usage state information of the terminal.

4. The method of claim 1, wherein the state information of the terminal includes at least one of information indicating whether a physical contact of the at least one antenna is occurred, information indicating a relative position of the at least one antenna, or movement status information of the terminal.

5. The method of claim 1, wherein selecting the at least one antenna is performed to select an antenna with a strong possibility of having a good channel state.

6. The method of claim 1, wherein selecting the antenna for the signal transmission and reception, based on the grip sensor information, is performed based on predefined relationship information that correlates the grip sensor information to first and second states of the antenna.

7. A terminal for selecting an antenna for transmitting and receiving a signal using a millimeter wave, the terminal comprising:
   a radio frequency (RF) unit including a plurality of antennas;
   a plurality of types of sensors; and
   a controller connected to the RF unit and the plurality of types of sensors configured to:
      control acquiring state information of the terminal from the plurality of types of sensors, select at least one antenna from among the plurality of antennas, based on the state information, and
      perform signal transmission and reception by using the at least one antenna,
   wherein the plurality of types of sensors comprises a grip sensor and a 6-axis sensor,
   wherein the controller is further configured to:
      determine whether a grip sensor interrupt is being received,
      during a period of time that the terminal is receiving the grip sensor interrupt, acquire grip sensor information from the grip sensor, and select an antenna for the signal transmission and reception to preferentially select an antenna having no physical contact, based on the grip sensor information, and during the period of time that the terminal is free from receiving the grip sensor interrupt, acquire 6-axis sensor information from the 6-axis sensor and select an antenna for the signal transmission and reception, based on the 6-axis sensor information, and wherein the 6-axis sensor information indicates which antenna is positioned relatively above.

8. The terminal of claim 7, wherein, when the at least one antenna includes two or more antennas, the two or more antennas are disposed at different positions of the terminal.

9. The terminal of claim 7, wherein the state information of the terminal includes at least one of movement state information or usage state information of the terminal.

10. The terminal of claim 7, wherein the state information of the terminal includes at least one of information indicating whether a physical contact of the at least one antenna is occurred, information indicating a relative position of the at least one antenna, or movement status information of the terminal.

11. The terminal of claim 7, wherein the controller further controls selecting an antenna with a strong possibility of having a good channel state.

* * * * *